(12) United States Patent
Svendsen et al.

(10) Patent No.: US 9,711,178 B2
(45) Date of Patent: Jul. 18, 2017

(54) LOCAL TIMELINE EDITING FOR ONLINE CONTENT EDITING

(75) Inventors: Jostein Svendsen, Saratoga, CA (US); Bjørn Rustberggaard, Nesøya (NO)

(73) Assignee: WeVideo, Inc., Menlo Park, CA (US)

(*) Notice: Subject to any disclaimer, the term of this patent is extended or adjusted under 35 U.S.C. 154(b) by 1163 days.

(21) Appl. No.: 13/433,252

(22) Filed: Mar. 28, 2012

(65) Prior Publication Data

US 2012/0254752 A1    Oct. 4, 2012

Related U.S. Application Data

(60) Provisional application No. 61/468,725, filed on Mar. 29, 2011, provisional application No. 61/564,256, (Continued)

(51) Int. Cl.
  *G11B 27/031*    (2006.01)
  *G06F 17/30*    (2006.01)
  (Continued)

(52) U.S. Cl.
  CPC ...... *G11B 27/031* (2013.01); *G06F 17/30781* (2013.01); *H04N 5/76* (2013.01);
  (Continued)

(58) Field of Classification Search
  CPC ... G06F 17/30781; G11B 27/031; H04N 5/76; H04N 21/222; H04N 21/233;
  (Continued)

(56) References Cited

U.S. PATENT DOCUMENTS 4,932,054 A    6/1990 Chou et al.
4,977,594 A    12/1990 Shear
(Continued)

OTHER PUBLICATIONS

Apple, Inc., "Final Cut Pro 7 User Manual", 2010, pp. 1-2, 1553-1583, 1995-2030 (69 pages).*

(Continued)

*Primary Examiner* — Ajay Bhatia
*Assistant Examiner* — Nicholas Klicos
(74) *Attorney, Agent, or Firm* — Sheppard, Mullin, Richter & Hampton LLP

(57) ABSTRACT

Local timeline editing for online content editing is disclosed. Various systems and methods described herein provide for online content editing, wherein user-created content is created or modified at an online content editor server in accordance with a timeline (associated with the user-created content) that is modified at a remote content editor client and subsequently received by the online content editor server. In a specific implementation, the creation and modification operations performed on the user-created content are performed at the online content editor server in accordance with the timeline received from the remote content editor client. The timeline can comprise information defining content within the user-created content, and define a temporal property of the content within the user-created content. The remote content editor client can be a thin client instance utilizing limited resources during operation and requiring very limited network bandwidth when transferred to the client.

20 Claims, 6 Drawing Sheets

Related U.S. Application Data filed on Nov. 28, 2011, provisional application No. 61/564,257, filed on Nov. 28, 2011, provisional application No. 61/564,261, filed on Nov. 28, 2011.

(51) Int. Cl.

| | | |
|---|---|---|
| *H04N 5/76* | (2006.01) | |
| *H04N 21/222* | (2011.01) | |
| *H04N 21/233* | (2011.01) | |
| *H04N 21/234* | (2011.01) | |
| *H04N 21/254* | (2011.01) | |
| *H04N 21/2543* | (2011.01) | |
| *H04N 21/472* | (2011.01) | |

(52) U.S. Cl.
CPC ......... *H04N 21/222* (2013.01); *H04N 21/233* (2013.01); *H04N 21/23424* (2013.01); *H04N 21/2541* (2013.01); *H04N 21/25435* (2013.01); *H04N 21/47205* (2013.01)

(58) Field of Classification Search
CPC ......... H04N 21/23424; H04N 21/2541; H04N 21/25435; H04N 21/47205
USPC .................................................. 715/716, 723
See application file for complete search history.

(56) References Cited

U.S. PATENT DOCUMENTS

| | | | |
|---|---|---|---|
| 5,247,575 A | 9/1993 | Sprague et al. | |
| 6,351,765 B1 | 2/2002 | Pietropaolo et al. | |
| 6,388,668 B1 | 5/2002 | Elliott | |
| 6,442,283 B1 | 8/2002 | Tewfik et al. | |
| 6,546,188 B1 | 4/2003 | Ishii et al. | |
| 7,120,859 B2 | 10/2006 | Wettach | |
| 7,375,768 B2 | 5/2008 | Herberger et al. | |
| 7,437,673 B2 | 10/2008 | Hyman et al. | |
| 7,587,509 B1 | 9/2009 | Edelman et al. | |
| 7,594,039 B2 | 9/2009 | Shima | |
| 7,617,278 B1 | 11/2009 | Edelman et al. | |
| 7,769,819 B2 * | 8/2010 | Lerman et al. | 709/217 |
| 7,809,802 B2 | 10/2010 | Lerman et al. | |
| 7,840,661 B2 | 11/2010 | Kalaboukis et al. | |
| 7,934,011 B2 | 4/2011 | Gavin et al. | |
| 7,945,615 B1 | 5/2011 | Shetty et al. | |
| 7,945,916 B1 | 5/2011 | Lozben et al. | |
| 8,051,287 B2 | 11/2011 | Shetty et al. | |
| 8,136,127 B1 | 3/2012 | Lozben et al. | |
| 8,156,176 B2 | 4/2012 | Lerman et al. | |
| 8,161,159 B1 | 4/2012 | Shetty et al. | |
| 8,166,191 B1 | 4/2012 | Swaminathan et al. | |
| 8,176,115 B2 | 5/2012 | Eves et al. | |
| 8,205,154 B2 | 6/2012 | Doepke et al. | |
| 8,209,611 B2 | 6/2012 | Yoshimine | |
| 8,209,618 B2 | 6/2012 | Garofalo | |
| 8,218,830 B2 | 7/2012 | Gavin et al. | |
| 8,225,228 B2 | 7/2012 | Marinkovich et al. | |
| 8,245,188 B2 | 8/2012 | Hertenstein | |
| 8,265,457 B2 | 9/2012 | Baum et al. | |
| 8,270,815 B2 * | 9/2012 | Yen et al. | 386/278 |
| 8,286,069 B2 | 10/2012 | Gavin et al. | |
| 8,302,008 B2 | 10/2012 | Hertenstein | |
| 8,331,735 B2 | 12/2012 | Lee et al. | |
| 8,341,525 B1 * | 12/2012 | Achour et al. | 715/716 |
| 8,411,758 B2 | 4/2013 | Folgner et al. | |
| 8,412,841 B1 | 4/2013 | Swaminathan et al. | |
| 8,433,611 B2 | 4/2013 | Lax et al. | |
| 8,451,276 B2 | 5/2013 | Jung | |
| 8,495,092 B2 | 7/2013 | Piccionelli et al. | |
| 8,510,441 B2 | 8/2013 | Ooi et al. | |
| 8,532,469 B2 | 9/2013 | Fiumi | |
| 8,577,204 B2 | 11/2013 | Lin et al. | |
| 8,639,086 B2 | 1/2014 | Chen et al. | |
| 8,667,016 B2 | 3/2014 | Sims et al. | |
| 8,667,532 B2 | 3/2014 | Heath | |
| 8,695,031 B2 | 4/2014 | Kumar et al. | |
| 8,719,865 B2 | 5/2014 | Moonka et al. | |
| 8,749,618 B2 | 6/2014 | Fiumi | |
| 8,788,941 B2 | 7/2014 | Hedges | |
| 8,806,346 B2 | 8/2014 | Hedges | |
| 8,812,672 B2 | 8/2014 | Ramaley et al. | |
| 8,831,999 B2 | 9/2014 | Bolton et al. | |
| 8,868,465 B2 | 10/2014 | Folgner et al. | |
| 8,910,045 B2 | 12/2014 | Baum | |
| 8,935,236 B2 | 1/2015 | Morita et al. | |
| 8,935,611 B2 | 1/2015 | Oberbrunner et al. | |
| 8,966,402 B2 | 2/2015 | Lu et al. | |
| 8,984,406 B2 | 3/2015 | Pueyo et al. | |
| 9,009,581 B2 | 4/2015 | Herberger et al. | |
| 9,026,446 B2 | 5/2015 | Fiumi | |
| 9,032,297 B2 | 5/2015 | Lovejoy et al. | |
| 9,032,298 B2 | 5/2015 | Segal et al. | |
| 2001/0041050 A1 | 11/2001 | Iwata et al. | |
| 2002/0083324 A1 | 6/2002 | Hirai | |
| 2002/0116716 A1 * | 8/2002 | Sideman | 725/91 |
| 2002/0144130 A1 | 10/2002 | Rosner et al. | |
| 2002/0181732 A1 | 12/2002 | Safavi-Naini et al. | |
| 2002/0181738 A1 | 12/2002 | Nakamura et al. | |
| 2003/0233462 A1 | 12/2003 | Chien | |
| 2005/0289068 A1 | 12/2005 | Stefik et al. | |
| 2006/0251383 A1 | 11/2006 | Vronay et al. | |
| 2006/0259589 A1 * | 11/2006 | Lerman et al. | 709/219 |
| 2007/0106419 A1 | 5/2007 | Rachamadugu | |
| 2007/0107032 A1 | 5/2007 | Rachamadugu | |
| 2007/0162855 A1 | 7/2007 | Hawk et al. | |
| 2007/0208442 A1 | 9/2007 | Perrone | |
| 2007/0250901 A1 | 10/2007 | McIntire et al. | |
| 2007/0277108 A1 * | 11/2007 | Orgill et al. | 715/730 |
| 2007/0300158 A1 | 12/2007 | Kasperkiewicz et al. | |
| 2008/0065771 A1 | 3/2008 | Marvit et al. | |
| 2008/0123976 A1 | 5/2008 | Coombs et al. | |
| 2008/0155614 A1 | 6/2008 | Cooper et al. | |
| 2008/0165388 A1 | 7/2008 | Serlet | |
| 2008/0183608 A1 | 7/2008 | Gavin et al. | |
| 2008/0183844 A1 * | 7/2008 | Gavin et al. | 709/217 |
| 2008/0193100 A1 * | 8/2008 | Baum et al. | 386/52 |
| 2008/0301228 A1 | 12/2008 | Flavin | |
| 2009/0007267 A1 | 1/2009 | Hoffmann | |
| 2009/0094147 A1 | 4/2009 | Fein et al. | |
| 2009/0157608 A1 | 6/2009 | Strathearn et al. | |
| 2009/0183081 A1 | 7/2009 | Rodriguez et al. | |
| 2009/0196570 A1 * | 8/2009 | Dudas et al. | 386/52 |
| 2010/0004944 A1 | 1/2010 | Palaniappan | |
| 2010/0169127 A1 | 7/2010 | Malackowski et al. | |
| 2010/0169779 A1 * | 7/2010 | Mason et al. | 715/717 |
| 2010/0192072 A1 | 7/2010 | Spataro et al. | |
| 2010/0226525 A1 | 9/2010 | Levy et al. | |
| 2010/0257457 A1 | 10/2010 | De Goes | |
| 2010/0260468 A1 * | 10/2010 | Khatib et al. | 386/52 |
| 2010/0285884 A1 | 11/2010 | Gauer et al. | |
| 2011/0026899 A1 * | 2/2011 | Lussier et al. | 386/281 |
| 2011/0029883 A1 * | 2/2011 | Lussier et al. | 715/738 |
| 2011/0167353 A1 | 7/2011 | Grosz et al. | |
| 2011/0213655 A1 | 9/2011 | Henkin et al. | |
| 2011/0214045 A1 * | 9/2011 | Sumler et al. | 715/202 |
| 2011/0246554 A1 * | 10/2011 | Bury et al. | 709/203 |
| 2011/0246892 A1 | 10/2011 | Hedges | |
| 2011/0282727 A1 | 11/2011 | Phan et al. | |
| 2011/0314390 A1 | 12/2011 | Park et al. | |
| 2012/0033948 A1 | 2/2012 | Rodriguez et al. | |
| 2012/0079606 A1 | 3/2012 | Evans et al. | |
| 2012/0130954 A1 | 5/2012 | Hood | |
| 2012/0189282 A1 | 7/2012 | Wyatt et al. | |
| 2012/0245952 A1 | 9/2012 | Halterman et al. | |
| 2012/0314025 A1 | 12/2012 | Fiumi | |
| 2013/0007669 A1 * | 1/2013 | Lu et al. | 715/848 |
| 2013/0111326 A1 | 5/2013 | Lockhart et al. | |
| 2013/0132462 A1 * | 5/2013 | Moorer | 709/203 |
| 2013/0275886 A1 | 10/2013 | Haswell et al. | |
| 2013/0311556 A1 | 11/2013 | Srivastava et al. | |
| 2014/0047413 A1 | 2/2014 | Sheive et al. | |

(56) References Cited

U.S. PATENT DOCUMENTS

2014/0096020 A1  4/2014  Grosz et al.
2014/0121017 A1  5/2014  Mandryk et al.
2014/0143218 A1  5/2014  Sanghavi et al.

OTHER PUBLICATIONS

Video Toolbox, "Video Toolbox—advanced online video editor. Convert, crop, merge or record videos with just few clicks.", 2009, accessed on Jul. 30, 2013, accessed from Internt <http://www.videtoolbox.com/>, pp. 1-2.*

Jokela et al., "Mobile Video Editor: Design and Evaluation", 2007, Springer-Verlag Berlin Heidelberg, pp. 344-353.*

* cited by examiner

_LOCAL TIMELINE EDITING FOR ONLINE CONTENT EDITING_

CROSS-REFERENCE TO RELATED APPLICATION

The present application claims benefit of: U.S. Provisional Patent Application Ser. No. 61/468,725 filed Mar. 29, 2011 and entitled "Media Management;" U.S. Provisional Patent Application Ser. No. 61/564,256 filed Nov. 28, 2011 and entitled "Local Timeline Editing for Online Content Editing;" U.S. Provisional Patent Application Ser. No. 61/564,257 filed Nov. 28, 2011 and entitled "Multi-Layer Timeline Content Compilation Systems and Methods;" and U.S. Provisional Patent Application Ser. No. 61/564,261 filed Nov. 28, 2011 and entitled "Systems and Methods for Low Bandwidth Consumption Online Content Editing;" which are incorporated herein by reference.

BACKGROUND

Generally, audio-video content editing on computer systems involves computationally intensive processes and utilizes larger amounts of computing resources than many other computer activities (e.g., word processing, browsing the Internet). This is particularly true when the content editing involves high quality audio or video content, which are notorious for being large in data size and process-heavy during content encoding and decoding processes.

Due to these computing needs, high quality audio-video content editing has typically been limited to powerful computing systems that tend to have the requisite computing resources to perform content editing quickly. If the same high quality content editing were to be performed on a less powerful computing system, the likely result would be slower or poorer content editing performance, possibly to the point where the content editing becomes impractical or impossible. Consequently, less powerful computing systems, such as older computer systems, netbooks, and particular mobile devices, are either prevented from performing audio-video content editing, or relegated to performing audio-video content editing involving only lower definition/quality content.

The foregoing example of trends and issues is intended to be illustrative and not exclusive. Other limitations of the art will become apparent to those of skill in the relevant art upon a reading of the specification and a study of the drawings.

SUMMARY

Techniques for local timeline editing are disclosed for online content editing. User-created content can be created or modified at an online content editor server in accordance with a timeline (associated with the user-created content) that is modified at a remote content editor client and subsequently received by the online content editor server. In a specific implementation, the creation and modification operations performed on the user-created content are performed at the online content editor server in accordance with the timeline received from the remote content editor client. The timeline can include information defining content within the user-created content, and define a temporal property of the content within the user-created content. Where user-created content is multi-layered, with each layer comprising content of the user-created content, the timeline can include a layer of the multi-layered user-created content and define content within such a layer. The content utilized within the user-created content can be stored at a content library datastore that is coupled to the online content editor server and remotely located in relation to the remote content editor client. To facilitate timeline modifications from a wider range of client computing devices (e.g., mobile devices having limited resources) and further reduce the need for data transfer from the online content editor server to the remote content editor client, the remote content editor client can be implemented at a client as a thin client instance. In accordance with some implementations, the thin client instance can be configured such that minimum operations are performed at the client (in accordance with various implementations described herein) and the remainder of operations at are performed at the server.

In particular implementations, modifications performed on a specific timeline at the remote content editor client can be relayed to the online content editor server as list of timeline edit instructions associated with the specific timeline that the online content editor server receives and then performs, or as a modified specific timeline transmitted from the remote content editor client to the online content editor server. The list of edit instructions can be generated by the remote online content editor client based on the modifications performed by the remote content editor client on a timeline received from the remote online content editor server and then locally maintained at the client.

Where a list of edit instructions are generated at the remote online content editor client and then relayed to the online content editor server, the online content editor server can perform the list of timeline edit instructions by either (a) editing, in accordance with the timeline edit instructions, a timeline maintained at the online content editor server and corresponding to the specific timeline modified at the remote content editor client, or (b) directly modifying content maintained at the online content editor server in accordance with the timeline editor instructions. Each timeline edit instruction in the list can comprise content identification information and/or time information, where the content identification information may identify a particular layer or content within a particular layer that will be affected by the timeline edit instruction, and where the time information may identify the position in the timeline where the content identified by the content identification information will be affected by the timeline edit instruction. Content identified in the timelines can be content that has been uploaded to, and then maintained by, the online content editor server for use in user-created content.

Depending on the implementation, a timeline associated with user-created content can be initially provided by the online content editor server to the remote content editor client, and can be stored locally at the remote content editor client for subsequent timeline modification operations at the remote content editor client. When the timeline is modified at the remote content editor client, the remote content editor client submits the modified timeline, the list of modifications, or list of modification instructions, to the online content editing server, which performs modifications to the user-created content in accordance with what is received.

By utilizing, creating, or modifying user-created content online in this manner, online content editing of user-created content using a remote content editor client and an online content editor server can be facilitated with communication of timelines or timeline edit instructions between the client and the server (where the timelines are associated with the user-created content). Additionally, the online content editing can be facilitated using the remote content editor client and the online content editor server while avoiding transmission of modified user-created content from the client to the server, and while obviating the need for substantial computing power at the remote content editor client. Overall, various implementations can leverage the computing power of the online content editing server when creating or modifying user-created content, with less computing power needed at the remote content editor client and with low usage of network bandwidth.

DETAILED DESCRIPTION

Techniques described in this paper can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used herein, the term 'processor' refers to one or more devices, circuits, and/or processing cores configured to process data, such as computer program instructions.

Figure 1:
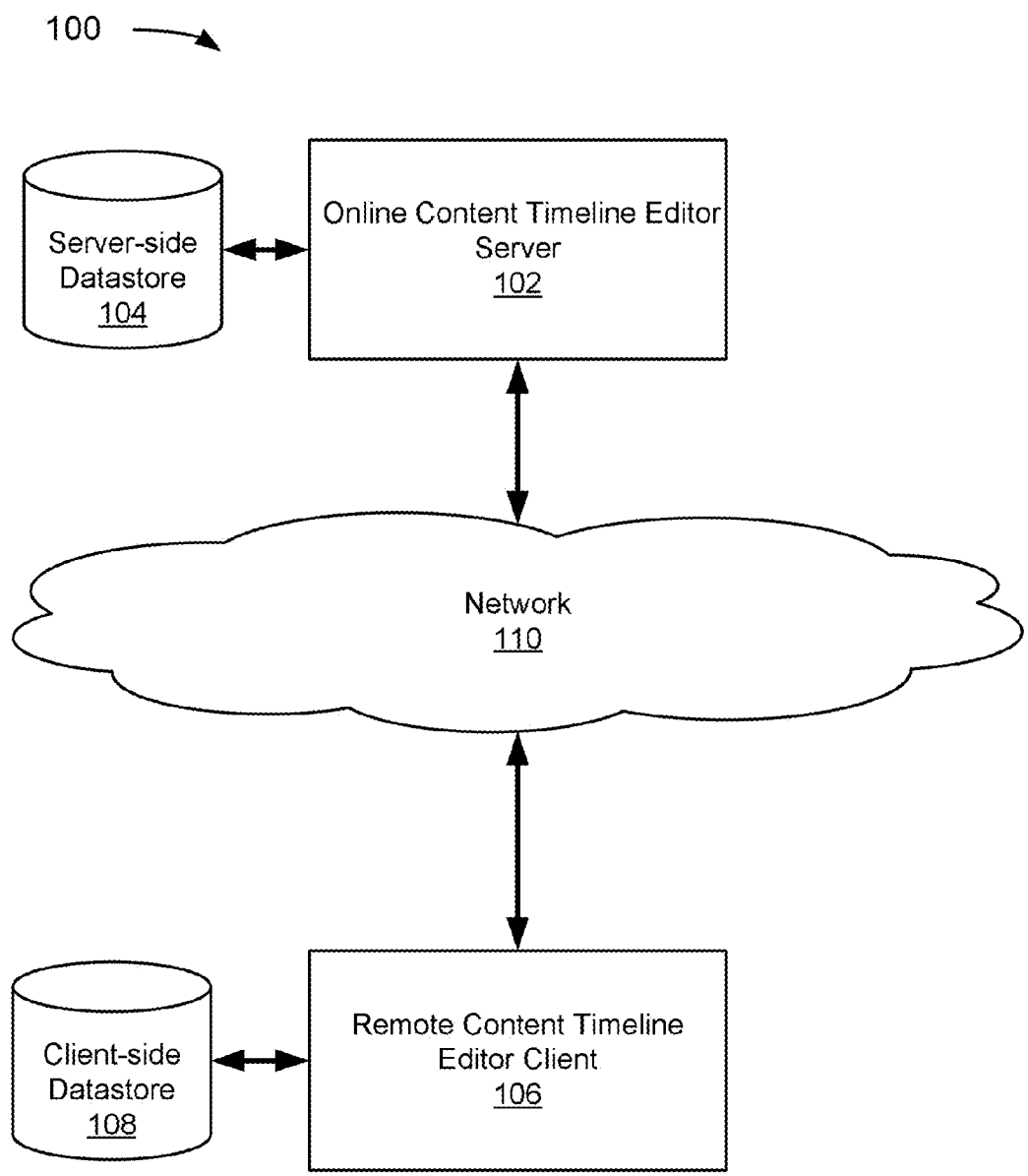
FIG. 1 depicts a diagram of an example of an online content timeline editor system.

FIG. 1 depicts a diagram of an example of an online content timeline editor system 100. The online content timeline editor system 100 includes an online content timeline editor server 102, a server-side datastore 104 coupled to the online content timeline editor server 102, an online content timeline editor client 106, a client-side datastore 108 coupled to the online content timeline editor client 106, and a network 110 through which the online content timeline editor client 106 communicates with the online content timeline editor server 102. Through this arrangement, the online content timeline editor client 106 can leverage the computing resources and power of the online content timeline editor server 102 when creating or modifying user-created content, especially when the user-created content comprises high quality graphics, image, audio, or video content. Often, the online content timeline editor server 102 comprises computing resources that surpass those of the online content timeline editor client 106, or computing resources that are better suited for content creation or modification than those of the online content timeline editor client 106. Though FIG. 1 depicts a single online content timeline editor client, the system 100 can include multiple online content timeline editor clients that can communicate with the online content timeline editor server 102.

"User-created content" as used herein includes any content authored by a user using the content creation/editing tools described in this paper, or some other content editing tool. The user-created content can be created to be multi-layered content, comprising multiple content layers of different content types. The user-created content has an associated timeline that can define the contents of the user-created content, and that can define a temporal property of the content of the user-created content. For example, the associated timeline can define the audio content in a layer of the user-created content, can define the duration of the audio content within the layer, and the temporal location of the audio content within the layer.

As used in this paper, an engine includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

In the example of FIG. 1, the online content timeline editor system 100 can enable a user at the online content timeline editor client 106 located remotely on the network 110 to instruct the online content timeline editor server 102 to create or modify user-created content on behalf of the client 106. As noted herein, in a specific implementation, the creation and modification of the user-created content can be in accordance with a timeline modified at the online content timeline editor client 106. Additionally, the user-created content can be multi-layered content comprising a plurality of content layers, where each content layer comprises one or more content items from a content library, and the timeline associated with the user-created content defines the content of each layer and a temporal property of such content.

As the online content timeline editor client modifies the timeline of the user-created content, the online content timeline editor server 102 can receive the resulting modified timeline from the client and create or modify the user-created content according to the modified timeline. In addition, the online content timeline editor client 106 can maintain local storage of the resulting modified timeline for backup purposes or for further modifications.

The online content timeline editor server 102 can provide the online content timeline editor client 106 with the latest version of the user-created content as based on the latest version of the timeline possessed by the server 102. For instance, the latest version of the user-created content provided by the online content timeline editor server 102 can be the user-created content as based on the latest modified timeline received from the online content timeline editor client 106. The online content editor client 106 can use the low bandwidth version of user-created content for review or editing purposes as the client 106 edits the timeline of the user-created content. For a specific implementation, the latest version of the user-created content provided by online content timeline editor server 102 can comprise a low bandwidth version of user-created content, thereby lessening the use of network bandwidth during online content editing.

In a specific implementation, the low bandwidth consumption online content editor server 102 can provide a low bandwidth version of user-created content as a content stream that buffers and plays at the online content editor client 106, or as a content file that is playable at the online content editor client 106 once the content file has been downloaded to the client 106 or while the content file is being downloaded by the client 106.

As the timeline of the user-created content is modified at the online content timeline editor client 106, one or more versions of the modified timeline, including the latest version of the modified timeline, can be stored on the client-side datastore 108. Likewise, as the online content timeline editor server 102 receives modified timelines, one or more versions of the modified timeline, including the latest version of the modified timeline received, can be stored on the server-side datastore 104. Multiple versions of the modified timeline can be stored on either the server-side datastore 104, the client-side datastore 108, or both for backup and restoration purposes (e.g., undo modifications to the user-created content). In a specific implementation, multiple version of the user-created content can be stored by way of the multiple versions of the modified timeline, rather than storing the multiple versions of the user-created content itself.

As the low bandwidth consumption online content editor server 102 creates and modifies the user-created content, one or more versions of the user-created content may be stored on the server-side datastore 104. The server 102 can store created or modified user-created content before the created or modified user-created content to the online content editor client 106. When the online content editor client 106 receives created or modified user-created content, the client 106 can store the created or modified user-created content on the client-side datastore 108 before the created or modified user-created content is reviewed or previewed at the client 106.

A datastore can be implemented, for example, as software embodied in a physical computer-readable medium on a general- or specific-purpose machine, in firmware, in hardware, in a combination thereof, or in an applicable known or convenient device or system. Datastores in this paper are intended to include any organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

Eventually, at the instruction of the online content timeline editor client 106, the online content timeline editor server 102 can publish a finalized version of the user-created content for download or sharing with others.

To facilitate timeline modifications from a wider range of client computing devices (e.g., mobile devices having limited resources) and further reduce the need for data transfer from the online content editor server to the remote content editor client, the online content editor client 106 can be implemented as a thin client instance. The thin client instance can be configured to perform minimum operations at the client to perform timeline editing, to transmit timeline modification information to the online content editor server (e.g., transmit modified timeline or timeline edit instructions), play content provided by the online content editor server (e.g., preview of user-created content rendered by the online content editor server based on timeline information received from the remote online content editor instance), or upload content to a content library maintain by the online content editor server (content which once uploaded, can be utilized in user-created content). Content editing operations not performed by the thin client instance at the online content editor client 106 would be performed at the online content editor server 102 (e.g., by a server online content editor instance).

Figure 2:
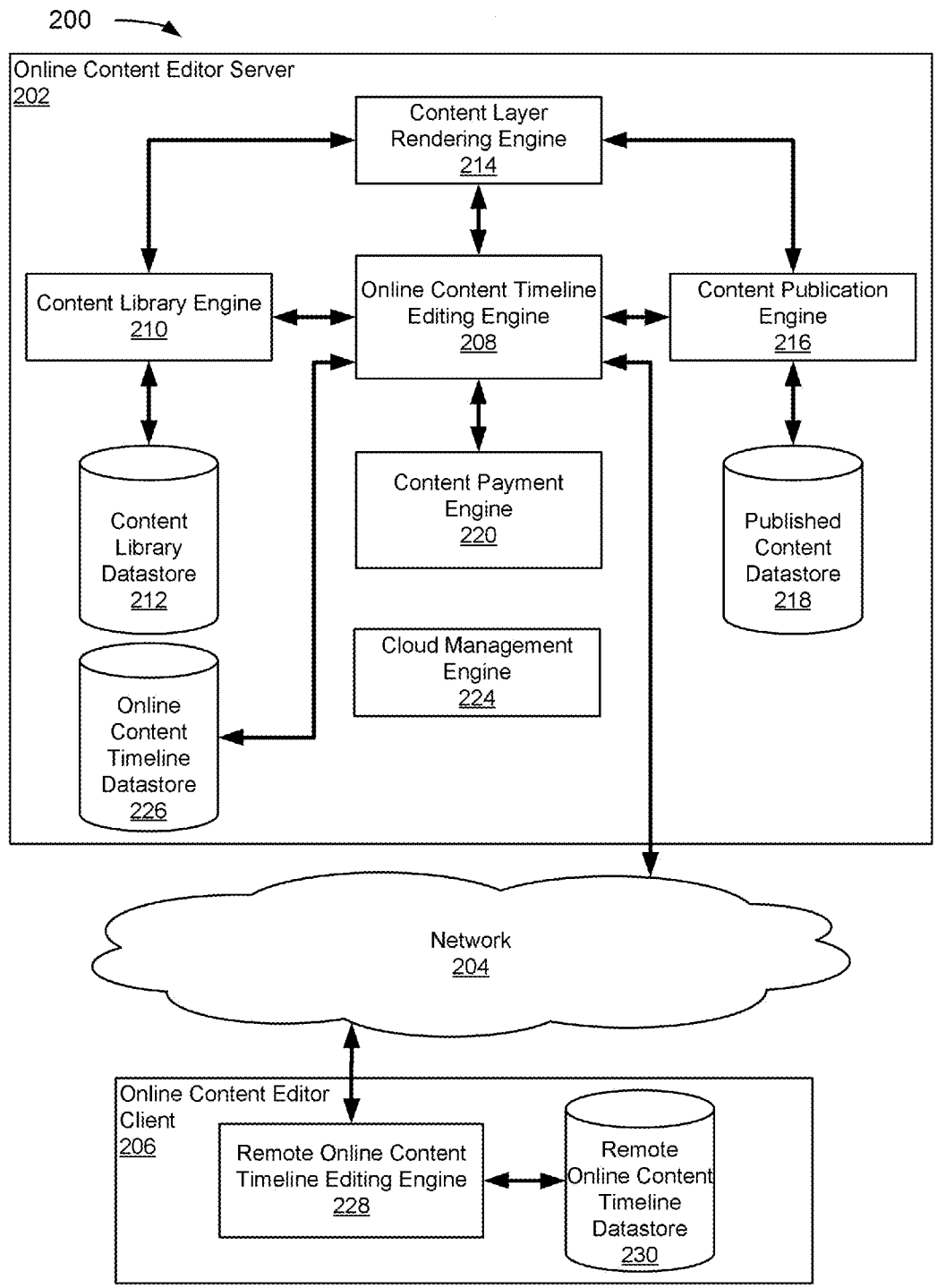
FIG. 2 depicts a diagram of an example of a thin client-server system for online content timeline editing.

FIG. 2 depicts a diagram of an example of a client-server system for online content timeline editing. The client-server system 200 for online content timeline editing includes an online content editor server 202, an online content editor client 206, and a network 204 facilitating communication between the server 202 and the client 206. As described herein, the client-server system 200 can enable a user at the online content editor client 206 located remotely on the network 204 to instruct the online content editor server 202 to create or modify user-created content at the server, and to create or modify the user-created content in accordance with a timeline modified at the online content editor client 206 and received at the online content editor server 202. As later discussed, in a specific implementation, the online content editor client 206 can modify the timeline of the user-created content through a remote online content timeline editor engine 228 located at the client 206. Subsequently, the online content editor client 206 can provide, and the online content editor server 202 can receive, the modified timeline associated with the user-created content. Depending on the implementation, the timeline can comprise a markup language that describes the content of the user-created content, and the temporal property of the content. The markup language can list content items from the content library datastore 212 contained within the user-created content, can map the content items from the content library datastore 212 to specific layers of the user-created content, and describe properties of the content items within the user-created content (e.g., temporal properties of content items, quality properties of content items, or usage properties of content items).

In the example of FIG. 2, the online content editor server 202 comprises an online content timeline editing engine 208, a content library engine 210, a content library datastore 212, a content layer rendering engine 214, a content publication engine 216, a published content datastore 218, a content payment engine 220, and an online content timeline datastore 226. The online content editor server 202 further comprises a cloud management engine 224.

In the example of FIG. 2, the online content timeline editing engine 208 creates or modifies user-created content at online content editor server 202 in accordance with a timeline associated with the user-created content, where the timeline is received from the online content editor client 206. Typically, the timeline received from the online content editor client 206 is a modified version of a timeline that is associated with the user-created content and already stored at the online content editor server 208. In a specific implementation, timelines associated with the user-created content may be stored in the online content timeline datastore 226. Subsequently, when a modified version of a timeline is received from the online content editor client 206, the modified version can replace the last version of the timeline already stored on online content timeline datastore 226, or can be stored on the online content timeline datastore 226 in addition to the last version of the timeline already stored.

In a specific implementation, the online content timeline editing engine 208 can establish a connection with the online content editor client 206 over the network 204, can receive commands relating to content creation or modification over a network connection, can provide a timeline associated with user-content to the online content editor client 206, can receive a modified timeline associated with user-content from the online content editor client 206, can perform content creation or modification operations in accordance with commands and modified timelines received from the online content editor client 206, and can transmit to the online content editor client 206 a low bandwidth version of the created or modified user-created content. The created or modified user-created content can include one or more content layers, each content layer comprising one or more content items from a content library as defined by the timeline provided to the online content editor server 202 by the online content editor client 206. Where the content has multiple layers, the content can be referred to as multi-layered content in accordance with the timeline provided to the online content editor server 202 by the online content editor client 206. Depending on the implementation, the content items utilized can be high quality content items or low bandwidth versions thereof.

In the example of FIG. 2, the online content timeline editing engine 208 is coupled to the content library engine 212, the content layer rendering engine 214, the content publication engine 216, the content payment engine 220, and the online content timeline datastore 226. The online content timeline editing engine 208 can store a timeline associated with user-created content to the online content timeline datastore 226, and retrieve a timeline associated with the user-created content from the online content timeline datastore 226. For example, when the online content timeline editing engine 208 receives a modified timeline from the remote content timeline editing engine 228, the online content timeline editing engine 208 can store the modified timeline on the online content timeline datastore 226. In another example, when the online content timeline editing engine 208 initially provides a latest version of a timeline associated with user-content to the remote content timeline editing engine 228, the latest version of the timeline can be retrieved from the online content timeline datastore 226. As noted herein, the online content timeline datastore 226 can maintain multiple versions of timelines associated with particular user-created content, from which previous versions of user-created content can be recreated.

Additionally, as discussed in detail below, the online content timeline editing engine 208 can access content items and information relating to the content items through the content library engine 212, can render one or more (content) layers of the user-created content at an adjusted quality using the content layer rendering engine 214, and can use the content publication engine 216 to publish the user-created content at an adjusted quality for download or sharing purposes. The adjustable-quality content quality editing engine 208 can receive pre-payment or post-payment through the content payment engine 220 to permit access to for-purchase content or to publish the user-defined content using for-purchase content (e.g., content of varying quality, such as high quality content).

The online content timeline editing engine 208 can establish a connection over the network 204 with the online content editor client 228 through the remote online content timeline editing engine 228. Through the connection, the online content timeline editing engine 208 can receive commands relating to content creation or modification from the remote online content timeline editing engine 228, can provide a timeline associated with user-content to the remote online content timeline editing engine 228, can receive a modified timeline associated with user-content from the remote online content timeline editing engine 228, can perform content creation or modification operations in accordance with commands and modified timelines received from the remote online content timeline editing engine 228, and can transmit to the remote online content timeline editing engine 228 a low bandwidth version of the created or modified user-created content for review and editing purposes.

In the example of FIG. 2, the content library engine 212 is coupled to the content library datastore 212 and manages the content items stored therein. In a specific implementation, the content library engine 212 can be responsible for adding, deleting and modifying content items stored on the content library datastore 212, for retrieving a listing of content items stored on the content library datastore 212, for providing details regarding content items stored on the content library datastore 212, and for providing to other engines content items from the content library. For example, the content library engine 212 can provide content items to the online content timeline editing engine 208 as a user reviews and select content items to be added to the user-created content. In another example, in accordance with a timeline associated with the user-created content, the content library engine 212 can provide content items to the content layer rendering engine 214 as the engine 214 renders one or more layers of the user-created content.

In the example of FIG. 2, the content library datastore 212 stores content items that can be used in the user-created content in accordance with a timeline associated with the user-created content. The content items of the content library datastore 212 can include audio content, video content, image content, graphics contents, user-provided content, and/or other content. In a specific implementation, the user-provided content can include the user-created content that was created or modified using the online content editor server 202 and subsequently added to the content library datastore 202, and user content uploaded from the online content editor client to the online content editor server 202. The content items of the content library datastore 212 can also include, for example, free content that can be used in user-created content without need of payment, for-purchase content that can be reviewed only after user payment, content that can be added to user-created content only after user payment, content that can be used in the publication of user-created content only after user payment, and/or other applicable content.

In a specific implementation, the content items can be added to, removed from, and adjusted within the user-created item without need of payment. When the user requests publication of the user-created content, the online content editor server 202 can request payment before publication of the user-created content is allowed. Alternatively, a payment can be requested in order for the user-created content to be published using the high quality content rather than a low bandwidth version of the high quality content.

In a specific implementation, the online content editor server 202 can use low bandwidth versions of the high quality content when performing creation and modification operations on the user-created content, where the use of the low bandwidth version continues until publication of the user-created content. In a specific implementation, the content library engine 212 can provide the server 202 with the low bandwidth version of the high quality content utilized during creation and modification operations. In a specific implementation, the content library engine 212 can generate the low bandwidth version as it is requested by various engines (e.g., the content layer rendering engine 214, or the online adjustable-quality content editing engine 208), or the content library engine 212 can provide the low bandwidth version as stored on the content library datastore 212. As described herein, the low bandwidth version of the high quality content can also be utilized by the online content timeline editing engine 208 when transmitting previews of content items from the content library datastore 212 to the online content editor client 206, or when a low bandwidth version of the user-created content is being transmitted to the online content editor client 206 for review or editing purposes.

The content stored on the content library datastore 212 (hereafter, also referred to as "content items") can have various associated properties (i.e., content item properties) that provide details regarding aspects of the content items. In a specific implementation, the content item properties can comprise such information as content type, content duration, content usage permissions (e.g., licensing rights), content cost parameters (e.g., free to use until the user-created content is published, or is published using high quality content), content data size, content source (e.g., user provided, or third party author), or content creation or modification date. Through online content timeline editing engine 208, a user using the remote online content timeline editing engine 228 can review listings of content items in the content library datastore 212 (e.g., available or unavailable content), review details regarding content items in the content library (e.g., price, usage parameters, content type, duration where applicable, or content definition/quality), manage content items in the content library datastore 212 (e.g., add, delete, or modify content items in the content library), and add content items from the content library datastore 212 to user-created content as the user modifies the timeline of the user-created content.

In the example of FIG. 2, the content layer rendering engine 214 renders one or more layers of the user-created content, in accordance with a timeline, using content items provided by the content library engine 212 from the content library datastore 212. The content items provided to the content layer rendering engine 214 can be high quality content or a lesser definition/quality version of the same. As noted herein, a timeline associated with the user-created content can define the content items used within the user-created content and how the content item is used. As the content layer rendering engine 214 renders layers of the user-created content, for the resulting layers, the online content timeline editing engine 208 can specify the content items used in the user-created content and how the content item is used in accordance with the timeline.

For instance, in accordance with a timeline associated with the user-created content, the online content timeline editing engine 208 can specify that the layers of the user-created content be rendered using specific video content item from the content library datastore 212, at a specific time within the user-created content, and for a specific duration. Thereafter, the user-created content comprising layers in accordance with the timeline can be provided to the online content editor client 206 by the online content timeline editing engine 208 for preview or editing purposes, or can be provided to the content publication engine 216 (e.g., for free publication of user-created content comprising lower definition/quality content). In a specific implementation, the online content timeline editing engine 208 can specify that the layers of the user-created content, comprising high quality content, be rendered using the high quality content, but only at the time of publication through the content publication engine 216, or only at after the user submits payment through the content payment engine 220.

In the example of FIG. 2, the content publication engine 216 receives user-created content rendered by the content layer rendering engine 214 and publishes the user-created content. The user-created content can be published such that the user-created content can be downloaded and saved by the user or others as a stand-alone content file (e.g., MPEG or AVI file), or such that user-created content can be shared to others over the network (e.g., posted to a website so that others can play/view the user-created content). Once published, the user-created content can be stored on the published version content datastore 218. In a specific implementation, the published user-created content can be added to the content library datastore 212 for reuse in other user-created content. In a specific implementation, the published user-created content can be added to the content library datastore 212 as for-purchase content (for example with the sales proceeds being split between amongst the user and the online content editor service provider), or added to the content library datastore 212 as free content available to the public. The user can also define content usage parameters (i.e., licensing rights) for their user-created content when the user-created content is added to the content library datastore 212.

In the example of FIG. 2, the content payment engine 220 facilitates user payment to the low bandwidth consumption online content editor server 202, and can determine the level of functionality provided by the low bandwidth consumption online content editor server 202, or the level of definition/quality for content within the user-created content. For example, once payment has been received by the content payment engine 220 and the content payment engine 220 has informed the online content timeline editing engine 208 of such payment, the online content timeline editing engine 208 can allow the user to access certain content items in the content library datastore 212 (e.g., for-purchase content), can allow the user to perform certain content creation or modification operations (e.g., splitting a content layer), can determine limitations on the timeline of the user-created content (e.g., duration of particular content items used in the user-created content, limit the time length of the entire user-created content), or can allow the user to publish the user-created content with high quality content. In a specific implementation, the definition/quality of the content within the user-created content may variable and determined based on the amount payment made by the user. The content payment engine 220 can maintain an account, where the user can maintain a positive balance from which funds are deducted as payments are made to the low bandwidth consumption online content editor server 202, or where charges are incurred to the account and the user submits payment some time after (e.g., a credit system). In a specific implementation, the online content timeline editing engine 208 can inform the content payment engine 220 of the costs accrued by the user as he or she uses content items from the content library datastore 212 in the user-created content, or as certain functionality of the online content timeline editing engine 208 is utilized. As noted herein, the pricing for content items can be stored with the content items in the content library datastore 212.

In a specific implementation, where the low bandwidth consumption online content editor server 202 is implemented using virtual or cloud-based computing resources, such virtual or cloud-based computer resources can be managed through the cloud management engine 224. The cloud management engine 224 can delegate various content-related operations and sub-operations of the server 202 to virtual or cloud-based computer resources, and manage the execution of the operations. In a specific implementation, the cloud management engine 224 can facilitate management of the virtual or cloud-based computer resources through an application program interface (API) that provides management access and control to the virtual or cloud-based infrastructure providing the computing resources for the low bandwidth consumption online content editor server 202.

In the example of FIG. 2, the online content editor client 206 comprises the remote online content timeline editing engine 228 coupled to a remote online content timeline datastore 230. The remote online content timeline editing engine 228 facilitates the creation or modification of user-created content at the online content editor server 202 by the online content editor client 206. The remote content timeline editing engine 228 can be utilized to receive a timeline associated with user-created content from the online content timeline editing engine 208, modify the timeline, and transmit the modified timeline to the online content timeline editing engine 208 to create or modify the user-created content accordingly. The remote content timeline editing engine 228 can comprise a user interface through which a user can instruct the online content timeline editing engine 208 to create or modify the user-created content at the online content timeline editing engine 208, and through which the user can modify a timeline associated with the user-created content and transmit the modified timeline to the online content timeline editing engine 208.

When a timeline is received by the remote online content timeline editing engine 228 from the online content timeline editing engine 208, the received timeline can be stored on the remote online content timeline datastore 230. Subsequently, when the received timeline is modified by the remote online content timeline editing engine 228, the modified timeline can be stored on the remote online content timeline datastore 230. As noted herein, multiple versions of the timeline can be stored on the remote online content timeline datastore 230 for subsequent timeline modification operations, or for backup and restoration purposes.

In accordance with the commands issued from the remote online content timeline editing engine 228 and the modified timeline received from the remote online content timeline editing engine 228, the online content timeline editing engine 208 can perform the content creation or modification operations at the online content editor server 202, and can return to the remote online content timeline editing engine 228 a low bandwidth version of the resulting user-created content.

In a specific implementation, the online content editor server 202 can provide the low bandwidth version of user-created content as a content stream that is buffered and played through the remote online content timeline editing engine 228, or as a content file that is playable by the remote online content timeline editing engine 228 once the content file has been downloaded to the online content editor client 206 and stored to the remote online content timeline datastore 230.

Figure 3:
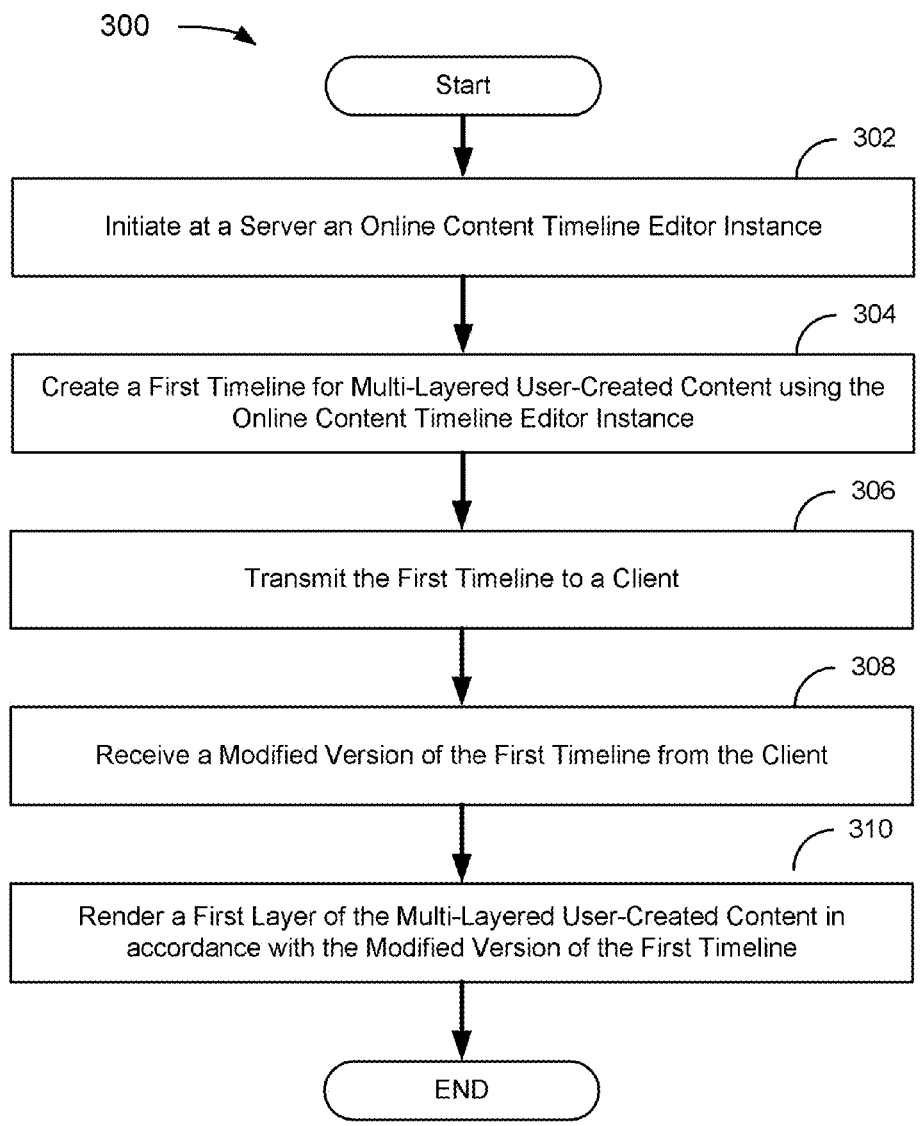
FIG. 3 depicts a flowchart of an example of a client-side method for online content timeline editing.

FIG. 3 depicts a flowchart of an example of a client-side method for online content timeline editing. In a specific implementation, the modules of the flowchart 300 and other flowcharts described in this paper are reordered to a permutation of the illustrated order of modules or reorganized for parallel execution. In the example of FIG. 3, the flowchart 300 starts at module 302 with initiating an online content timeline editor instance at a server. Once initiated, the online content timeline editor instance can perform content creation or modification operations on multi-layered user-created content at the server in accordance with modified timelines the online content timeline editor instance receives from a remote online content timeline editor instance. I In various implementations, the remote online content timeline editor instance can be a thin client instance, configured to utilize limited computing resources to operate and/or configured to provide functionality limited to editing timelines and receiving content from the online content editor server. Depending on the implementation, the thin client instance may comprise components configured to receive timeline information, to transmit timeline modification information to the online content editor server (e.g., transmit modified timeline or timeline edit instructions), play content provided by the online content editor server (e.g., preview of user-created content rendered by the online content editor server based on timeline information received from the remote online content editor instance), or upload content to a content library maintain by the online content editor server (content which once uploaded, can be utilized in user-created content). The server can be implemented on a conventional computing device, preferably a server-class computing device, or a virtual computing or cloud-based server.

In the example of FIG. 3, the flowchart 300 continues to module 304 with creating a first timeline for multi-layered user-created content using the online content timeline editor instance. As described herein, the timeline can be associated with the multi-layered user-created content, can define the content of the multi-layered user-created content, and can define a temporal property of the content in the multi-layered user-created content.

Generally, the first timeline can be created at the server, and can be created for a multi-layered user-created content that already exists at the server or is created for a multi-layered user-created content that is created concurrently with the first timeline. In particular implementation, when created the first timeline can be stored locally with respect to the server, on server-side a datastore. Eventually, when the online content timeline editor instance receives a modified version of the first timeline from the remote content timeline editor instance, the first timeline stored on the server-side datastore can be replaced with the modified timeline, or can be modified according to the modified version. Alternatively, when a modified version of the first timeline is received, the modified version can be added to the server-side datastore and the first timeline can remain on the server-side datastore as a back-up to the modified version.

In the example of FIG. 3, the flowchart 300 continues to module 306 with providing the first timeline to a client. In a specific implementation, the client can be operating a remote content timeline editor instance configured to operate on a thin client, which can receive the first timeline from the server. Upon receiving the first timeline, the client can store the first timeline for subsequent timeline modification operations. As described herein, through the remote content timeline editor instance at the client, the client can convey modifications to the content within the multi-layered user-created content by modifying the timeline associated with the multi-layered user-created content and subsequently, providing the modified timeline to the online content timeline editor instance at the server.

In the example of FIG. 3, the flowchart 300 continues to module 308 with receiving of a modified version of the first timeline from the client. The modified version of the first timeline can be received from the client by the online content timeline editor instance, and can be transmitted from the client to the server by a remote content timeline editor instance. Once received the modified version of the first timeline can be stored at the server on a server-side datastore. As noted herein, the modified version of the first timeline can replace a version of the first timeline already existing on the server-side datastore, or can be modify the version of the first timeline already existing on the server-side datastore. Alternatively, when a modified version of the first timeline is received, the modified version can be added to the server-side datastore and the first timeline can remain on the server-side datastore as a back-up to the modified version. The version of the first timeline already existing on the server-side datastore could be a previously received modified version of the first timeline.

In the example of FIG. 3, the flowchart 300 continues to module 310 with rendering of a first layer of the multi-layered user-created content in accordance with the modified version of the first timeline received from the client. As noted herein, various versions of a timeline can define content within a layer of the multi-layered user-created content, and define a temporal property of the content within the layer. In a specific implementation, the online content timeline editor instance can receive the modified version of the timeline, and provide the modified version to a rendering engine. The rendering engine can render the first layer by obtaining content from a content library in accordance with the modified version of the timeline, and rendering the content in first layer in accordance with a temporal property from the modified version.

Figure 4:
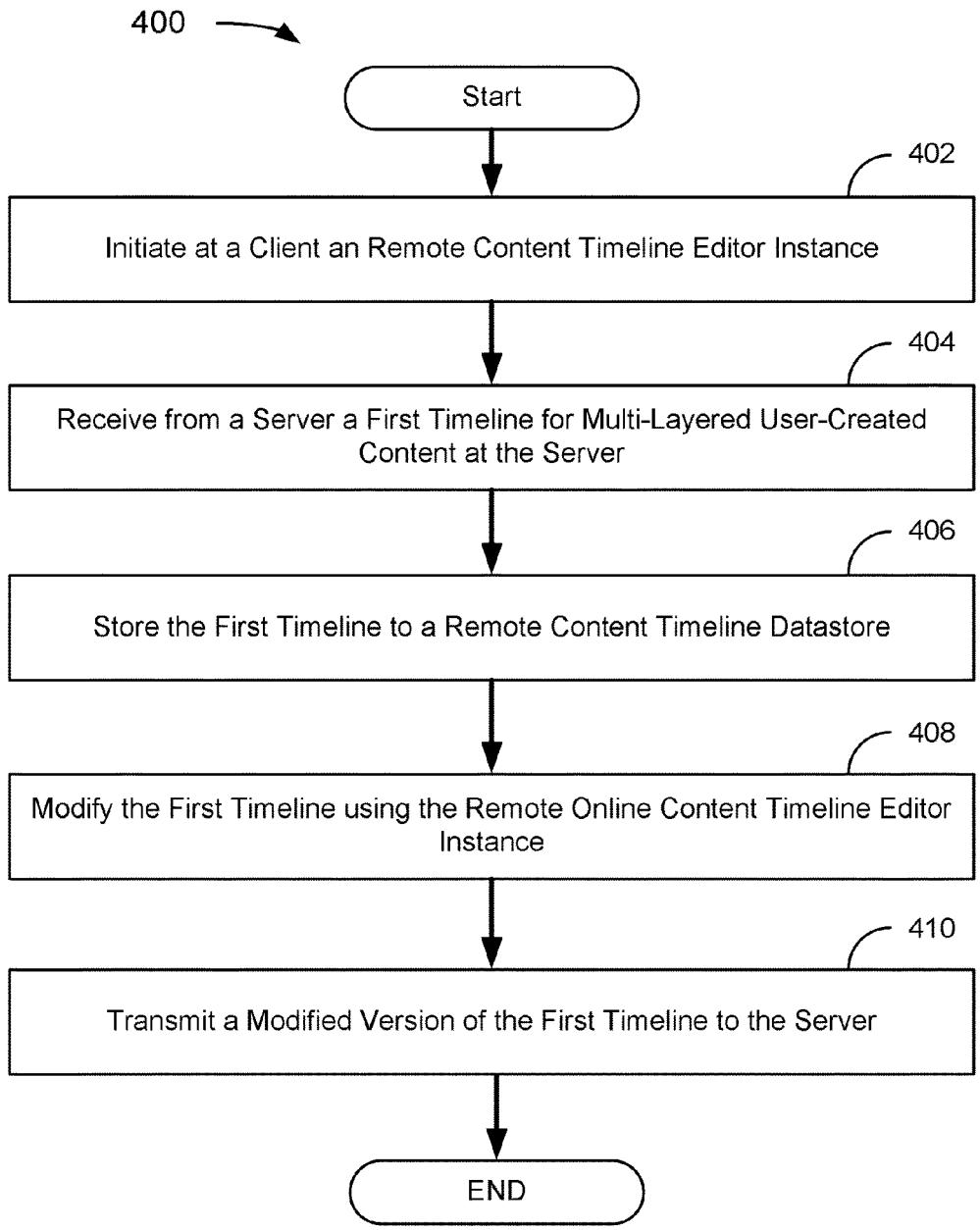
FIG. 4 depicts a flowchart of an example of a server-side method for online content timeline editing.

FIG. 4 depicts a flowchart of an example of a server-side method for online content timeline editing. In a specific implementation, the modules of the flowchart 400 and other flowcharts described in this paper are reordered to a permutation of the illustrated order of modules or reorganized for parallel execution. In the example of FIG. 4, the flowchart 400 starts at module 402 with initiating a remote content timeline editor instance at a client. The client can be implemented by any known or convenient computing device including, for example, mobile computing devices, netbooks, and desktop. Generally, the server possesses computing resources in excess of those of the client, or the server possesses computing resources better suited for content creation or modification than those of the client.

In the example of FIG. 4, the flowchart 400 continues to module 404 with receiving from a server a first timeline for multi-layered user-created content at the server. In a specific implementation, the remote content timeline editor instance can receive the first timeline from the server. For a specific implementation, an online content timeline editor instance at the server can transmit the first timeline to the remote content timeline editor instance at the client. The first timeline for multi-layered user-created content can be initially created at the server when the multi-layered user-created content is initially created at the server, or can be initially created for multi-layered user-created content already existing at the server.

In the example of FIG. 4, the flowchart 400 continues to module 406 with storing the first timeline to a remote content timeline datastore. As noted herein, the remote content timeline datastore can store multiple versions of the first timeline as received from the server. Typically, the client can store the first timeline on a client-side datastore.

In the example of FIG. 4, the flowchart 400 continues to module 408 with modifying the first timeline using the remote content timeline editor instance. In a specific implementation, modifications to the first timeline at the client can result when a user utilizes the remote content timeline editor instance to add or delete content to a layer of the multi-layered user-created content. For example, when a user uses the remote content timeline editor instance to add or delete a content item from a content library, the remote content timeline editor instance can implement the addition or deletion as a corresponding modification to the first timeline stored locally at the client on a client-side datastore.

Likewise, modifications to the first timeline at the client can also result when a user utilizes the remote content timeline editor instance to modify a temporal property of content within a layer of the multi-layered user-created content. For instance, when a user uses the remote content timeline editor instance to shorten the duration or temporal position of video content within a layer of the multi-layered user-created content, the remote content timeline editor instance can implement such temporal changes as corresponding modifications to the first timeline stored locally at the client on a client-side datastore.

In the example of FIG. 4, the flowchart 400 continues to module 410 with transmitting the modified version of the first timeline to the server. As noted herein, an online content timeline editor instance at the server can receive the modified version from the remote content timeline editor instance at the client. As also noted herein, upon receiving the modified version of the first timeline, the server can implement changes to the multi-layered user-created content in accordance with the modified version of the first timeline received from the remote content timeline editor.

Where implementations described herein facilitate timeline modifications by transmitting modified timelines from the client to the server, those skilled in the art will appreciate that various embodiments can facilitate similar timeline modifications by transmitting a list of timeline edit instructions from the client to the server. Depending on the implementation, the list of timeline edit instruction can be transmitted from the client to the server in place of, or possibly in addition to, transmitting the entire, modified timeline from the client to the server. In doing so, various implementations can further reduce the bandwidth utilized by a remote online content editor client when transmitting content editor to a online content editor server.

Figure 5:
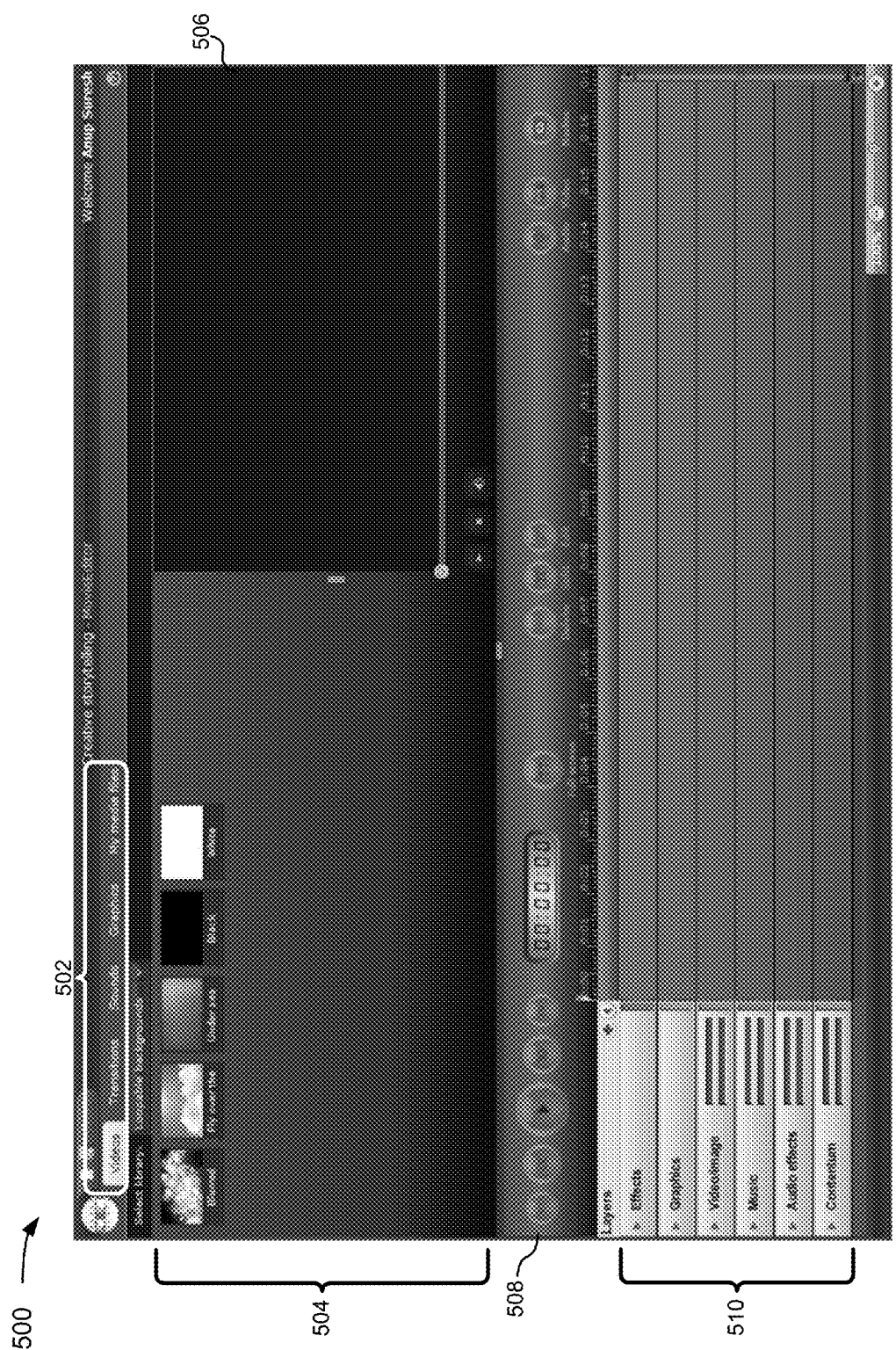
FIG. 5 depicts an example of a client-side user interface for online content timeline editing.

FIG. 5 depicts an example of client-side user interface for online content timeline editing. Through the client-side user interface, a user at a client can perform online content editing at an online content editor server while consuming low bandwidth over a network connection. In particular, the client-side user interface can be used at the client to create or edit user-created content residing at the server. The client-side user interface can be transferred from a server to a client as a module that can then be operated on the client. For example, the client-side user interface can comprise a client-side applet or script that is downloaded to the client from the server and then operated at the client (e.g., through a web browser). Additionally, the client-side user interface can operate through a plug-in that is installed in a web browser. User input to the client-side user interface can cause a command relating to online content editing, such as a content layer edit command or a content player/viewer command, to be transmitted from the client to the server.

The client-side user interface 500 includes multiple controls and other features that enable a user at a remote online editor to control the creation or modification of user-created content at a server by locally editing a timeline at the remote content timeline editor client, where the timeline is associated with the user-created content. In the example of FIG. 5, the client-side user interface 500 includes a tabbed menu bar 502, a content listing 504, a content player/viewer 506, content player/viewer controls 508, content layer editor controls 510, a content timeline indicator 512, and a content layering interface 514.

In the example of FIG. 5, the client-side user interface 500 includes the tabbed menu bar 502 that allows the user to select between different content types (e.g., video, audio, or images) as they search for content available to them from a content library. Here, the tabbed menu bar 502 allows the user to select between reviewing "Videos," "Sounds," "Graphics" (e.g., text or images), or personal (media) content (i.e., "My media files") that is available from the content library. The personal content can be that which the user uploaded to their account on the server, that which the user already created on the server, or both. Those of ordinary skill in the art would appreciate that in a specific implementation, the tabbed menu bar 502 can include additional content types (e.g., "3D Video") from which the user can select as they search for content available to them from the content library.

The tabbed menu bar 502 also enables the user to select "Transitions," which can be predefined or user-created content transitions inserted between two content items in a layer of user-created content. For instance, with respect to video content (i.e., video clips), available transitions can include a left-to-right video transition which once inserted between a first video clip and a second video clip, cause the first video clip transition to the second video clip in a left-to-right manner. Likewise, with respect to audio content (i.e., audio clips), available transitions can include a right-to-left transition which once inserted between a first audio clip and a second audio clip, causes the first audio clip to fade into to the second audio clip starting from the right audio channel and ending at the left audio channel.

As the user selects between the content types in the tabbed menu bar 502, a listing of available content matching the selected content type can be displayed to the user accordingly. In the example of FIG. 5, the content listing 504 displays a list of content available from the content library. In a specific implementation, the content listing 504 can list the available content with a thumbnail image configured to provide the user with a preview of the content. For example, for video content, the thumbnail image may be a moving image that provided a brief preview of the video content. With respect to image content, the thumbnail preview may be a smaller sized version (e.g., lower resolution version) of the image content. In a specific implementation, a content item listed in content listing 506 can be further previewed in a content player/viewer 506, configured to play audio or video or display larger resolution images. The content listing 504 can also provide details regarding the listed content including, without limitation, a source of the content, a date of creation for the content, a data size of the content, a time duration of the content (where applicable), licensing information relating to the content, and cost of using the content.

In the example of FIG. 5, a user can utilize the player/viewer 506 to preview content items from the content library listed in the content listing 504. The content player/viewer 506 can also provide a preview of user-created content being created through the client-side user interface 500. In one example, the user can create user-created content, containing one or more video and audio content items from the content library, and then preview that user-created content through the content player/viewer 506. In a specific implementation, as the user-created content is previewed through the content player/viewer 506, the server can stream such user-created content to the client as it is being played or shown. In a specific implementation, the user-created content can be first downloaded to the client before it is played or shown through the content player/viewer 506.

As described herein, the content library items or the user-created content shown through the content player/viewer 506 can be of a lower definition/quality than the actual definition/quality of the content residing on the server or the content that is eventually rendered by the server. Because the lower definition/quality content requires less bandwidth when being transferred from the server to a client, a specific implementation can lower the data bandwidth consumption between the client and server as content is created, edited, and previewed through the client-side user interface 500.

In the example of FIG. 5, a user controls the operations of the content player/viewer 506 using the content player/viewer controls 508. The content player/viewer controls 508 can include control commands common to various players, such as previous track, next track, fast-backward, fast-forward, play, pause, and stop. In a specific implementation, a user input to the content player/viewer controls 508 can result in a content player/viewer command instruction being transmitted from the client to the server.

In the example of FIG. 5, the content layer editor control 510 comprises controls that enable the user to edit content layers of user-created content, and to modify the content layers according to the timeline of the user-created content. Through the content layer editor control 510, a user can implement edits to a content layer of the user-created content residing on the server. The content layer editor control 510 can include edit controls that enable a user to add, delete or modify one or more content layers of user-created content. Example edit controls include, without limitation, adding a content layer, deleting a content layer, splitting a single content layer into two or more content layers, and editing properties of a content layer.

As edits are implemented to content layers of the user-created content, the timeline of the user-created content can be locally modified at the remote content editor client. As described herein, the resulting modified timeline can be subsequently transmitted from the remote content editor client to the online content editor server, and the online content editor server can create or modify the user-created content in accordance with the modified timeline received. In a specific implementation, a modification to a content layer of the user-created content through the content layer editor control 510 can result in corresponding, local modifications to the timeline of the user-created content. For instance, an addition or deletion of content to the content layer, or a temporal change with respect to content in the content layer (e.g., duration of the content, temporal position of content in the timeline of the user-created content) can result in a corresponding, local modification of the timeline at the remote content editor client. In doing so, certain changes to the content layer of the user-created content can be conveyed from the remote content editor client to the online content editor server through the resulting modified timeline.

In the example of FIG. 5, the content timeline indicator 512 visually assists a user in determining a temporal position of a content layer in user-created content or a content item in the content layer. For instance, the content timeline indicator 512 can comprise a time marker that indicates a temporal start point or a temporal end point for a content layer or a content item in the content layer. In a specific implementation, the length of the content timeline indicator 512 can adapt according to the overall duration of the user-created creation, or can be adjusted according to a user-setting.

In the example of FIG. 5, the content layering interface 514 enables a user to access and modify content layers of the user-created content. The content layering interface 514 can comprise a stack of content layer slots, where each content layer slot graphically presents all the content layers of a particular content type associated to the user-created content. Example content types include, without limitation, graphical content (e.g., "Graphics"), video content (e.g., "Video"), image content (e.g., "Image"), and audio content (e.g., "Audio effects"). The content layering interface 514 can also comprise image, video or audio effects, which can be applied to the various content types.

In a specific implementation, the user can add content to a new or existing content layer of the user-created content by "dragging-and-dropping" content items from the content listing 504 into the content layering interface 514. Further, in a specific implementation, the user can graphically modify a temporal position or duration of a content layer or a content item within the content layer. For instance, the user can drag-and-drop the graphically represented start or end of a content item to adjust the duration of the content item (thereby the temporal start of temporal end of the content item) in the user-created content.

Figure 6:
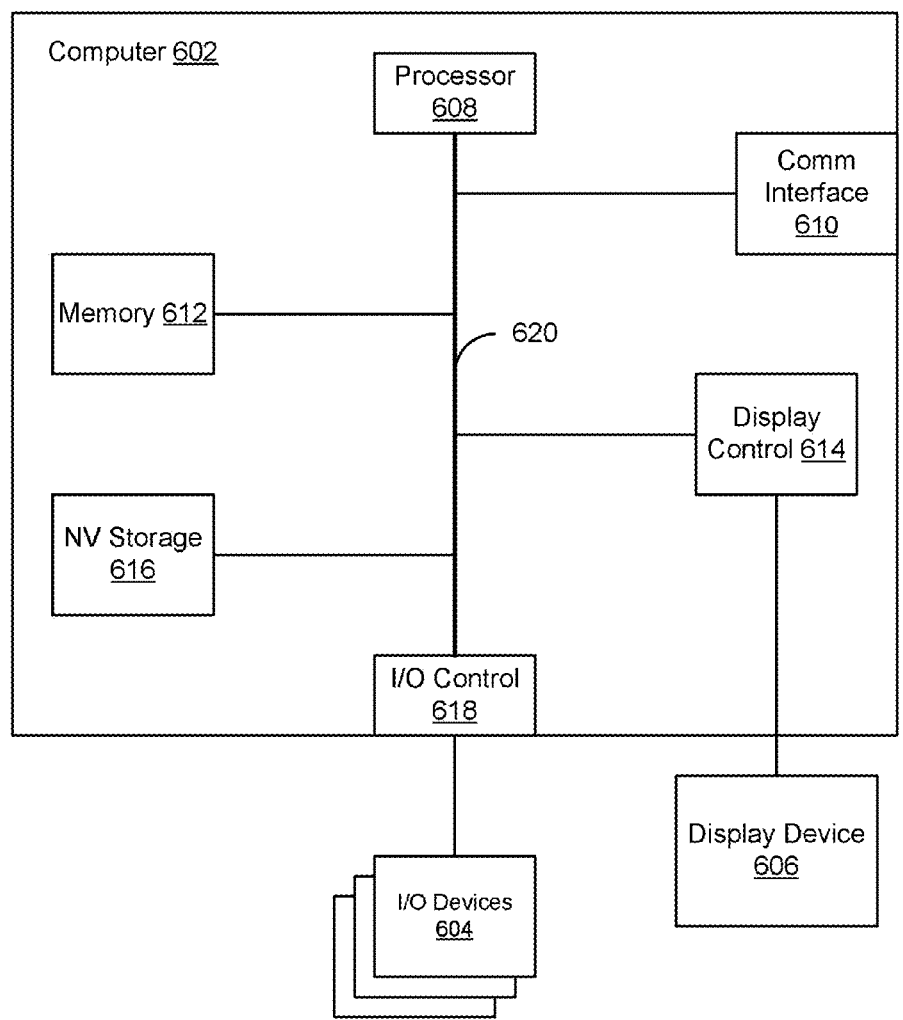
FIG. 6 depicts an example of a system on which techniques described in this paper can be implemented.

FIG. 6 depicts an example of a system on which techniques described in this paper can be implemented. The computer system 600 may be a conventional computer system that can be used as a client computer system, such as a wireless client or a workstation, or a server computer system. The computer system 600 includes a computer 602, I/O devices 604, and a display device 606. The computer 602 includes a processor 608, a communications interface 610, memory 612, display controller 614, non-volatile storage 616, and I/O controller 618. The computer 602 may be coupled to or include the I/O devices 604 and display device 606.

The computer 602 interfaces to external systems through the communications interface 610, which may include a modem or network interface. It will be appreciated that the communications interface 610 can be considered to be part of the computer system 600 or a part of the computer 602. The communications interface 610 can be an analog modem, ISDN modem, cable modem, token ring interface, satellite transmission interface (e.g. "direct PC"), or other interfaces for coupling a computer system to other computer systems.

The processor 608 may be, for example, a conventional microprocessor such as an Intel Pentium microprocessor or Motorola power PC microprocessor. The memory 612 is coupled to the processor 608 by a bus 670. The memory 612 can be Dynamic Random Access Memory (DRAM) and can also include Static RAM (SRAM). The bus 670 couples the processor 608 to the memory 612, also to the non-volatile storage 616, to the display controller 614, and to the I/O controller 618.

The I/O devices 604 can include a keyboard, disk drives, printers, a scanner, and other input and output devices, including a mouse or other pointing device. The display controller 614 may control in the conventional manner a display on the display device 606, which can be, for example, a cathode ray tube (CRT) or liquid crystal display (LCD). The display controller 614 and the I/O controller 618 can be implemented with conventional well known technology.

The non-volatile storage 616 is often a magnetic hard disk, an optical disk, or another form of storage for large amounts of data. Some of this data is often written, by a direct memory access process, into memory 612 during execution of software in the computer 602. One of skill in the art will immediately recognize that the terms "machine-readable medium" or "computer-readable medium" includes any type of storage device that is accessible by the processor 608 and also encompasses a carrier wave that encodes a data signal.

The computer system 600 is one example of many possible computer systems which have different architectures. For example, personal computers based on an Intel microprocessor often have multiple buses, one of which can be an I/O bus for the peripherals and one that directly connects the processor 608 and the memory 612 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 612 for execution by the processor 608. A Web TV system, which is known in the art, is also considered to be a computer system, but it may lack some of the features shown in FIG. 6, such as certain input or output devices. A typical computer system will usually include at least a processor, memory, and a bus coupling the memory to the processor.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

Although the foregoing implementations have been described in some detail for purposes of clarity of understanding, the invention is not necessarily limited to the details provided.

We claim:

1. A system for low bandwidth consumption online content editing, the system comprising:
    a server-side online content timeline editing engine;
    a content layer rendering engine coupled to the server-side online content timeline editing engine;
    a content library engine coupled to the content layer rendering engine;
    a content library datastore coupled to the content library engine, wherein the content library datastore comprises content;
    wherein, in operation:
        the server-side online content timeline editing engine creates a first content timeline for multi-layered user-created content, wherein the first content timeline comprises information defining a first layer of the multi-layered user-created content, information defining content within the first layer, and information defining a temporal property of the content within the first layer;
        the server-side online content timeline editing engine transmits the first content timeline to a client;
        the server-side online content timeline editing engine receives a second content timeline from the client, wherein the second content timeline is a modified version of the first content timeline;
        the content library engine provides the content from the content library datastore to the content layer rendering engine;
        the content layer rendering engine renders the first layer of the multi-layered user-created content in accordance with the second content timeline.

2. The system of claim 1, further comprising a server-side online content timeline datastore coupled to the server-side online content timeline editing engine;
    wherein, in operation:
        the server-side online content timeline editing engine stores the first content timeline at the server-side online content timeline datastore;
        the server-side online content timeline editing engine replaces the first content timeline on the server-side online content timeline datastore with the second content timeline.

3. The system of claim 1, further comprising the server-side online content timeline datastore coupled to the server-side online content timeline editing engine;
    wherein, in operation:
        the server-side online content timeline editing engine stores the first content timeline at the server-side online content timeline datastore;
        the server-side online content timeline editing engine modifies the first content timeline on the server-side online content timeline datastore in accordance with the second content timeline.

4. The system of claim 1, wherein the temporal property of the content is selected from a group consisting of a temporal position of the content in the first layer and a duration of the content in the first layer.

5. The system of claim 1, wherein the content library engine is further coupled to the server-side online content timeline editing engine;
    wherein, in operation:
        the content library engine informs the server-side online content timeline editing engine of available content in the content library datastore;
        the server-side online content timeline editing engine transmits a list of the available content to the client.

6. The system of claim 1, wherein, in operation:
    the server-side online content timeline editing engine receives a connection from the client, wherein the first content timeline is transmitted to the client through the connection, and wherein the second content timeline is received from the client through the connection.

7. The system of claim 6, wherein the connection is received from a client-side online content timeline editing engine at the client.

8. A system for low bandwidth consumption online content editing, the system comprising:
    a processor;
    a client-side online content timeline editing engine;
    a client-side online content timeline datastore coupled to the client-side online content timeline editing engine;
    wherein, in operation:
        the client-side online content timeline editing engine causes the processor to receive a first content timeline from an online content timeline editing engine at a server, wherein multi-layered user-created content is remotely created or modified at the server, and wherein the first content timeline comprises information defining a first layer of the multi-layered user-created content, information defining content within the first layer, and information defining a temporal property of content within the first layer;
        the client-side online content timeline editing engine causes the processor to store the first content timeline to the client-side online content timeline datastore;
        the client-side online content timeline editing engine causes the processor to modify the first content timeline of the multi-layered user-created content;
        the client-side online content timeline editing engine causes the processor to transmit a modified version of the first content timeline to a server-side online content timeline editing engine.

9. The system of claim 8, wherein the client-side online content timeline editing engine causes the processor to modify the first content timeline on the client-side online content timeline datastore before transmitting the modified version to the server-side online content timeline editing engine.

10. The system of claim 8, wherein the client-side online content timeline editing engine causes the processor to modify the information in the first content timeline.

11. The system of claim 8, wherein, in operation:
the client-side online content timeline editing engine causes the processor to receive a list of available content from the server-side online content timeline editing engine, wherein the client-side online content timeline editing engine causes the processor to utilize an item from the list when modifying the first content timeline.

12. A method for low bandwidth consumption online content editing, the method comprising:
creating a first content timeline for multi-layered user-created content, wherein the first content timeline comprises information defining a first layer of the multi-layered user-created content, information defining content within the first layer, and information defining a temporal property of content within the first layer;
transmitting the first content timeline to a client;
receiving a second content timeline from the client, wherein the second content timeline is a modified version of the first content timeline;
rendering the first layer of the multi-layered user-created content in accordance with the second content timeline.

13. The method of claim 12, further comprising:
storing the first content timeline at a server-side online content timeline datastore;
replacing the first content timeline on the server-side online content timeline datastore with the second content timeline.

14. The method of claim 12, further comprising:
storing the first content timeline at a server-side online content timeline datastore;
modifying the first content timeline on the server-side online content timeline datastore in accordance with the second content timeline.

15. The method of claim 12, wherein the temporal property of the content is selected from a group consisting of a temporal position of the content in the first layer and a duration of the content in the first layer.

16. The method of claim 12, further comprising:
informing a server-side online content timeline editing engine of available content in a content library datastore;
transmitting a list of the available content to the client.

17. The method of claim 12, further comprising receiving a connection from the client, wherein the first content timeline is transmitted to the client through the connection, and wherein the second content timeline is received from the client through the connection.

18. A method for low bandwidth consumption online content editing, the method comprising:
receiving a first content timeline for multi-layered user-created content, wherein the first content timeline comprises information defining a first layer of the multi-layered user-created content, information defining content within the first layer, and information defining a temporal property of content within the first layer;
storing the first content timeline to a client-side online content timeline datastore;
modifying the first content timeline of multi-layered user-created content;
transmitting a modified version of the first content timeline to a server-side online content timeline editing engine.

19. The method of claim 18, further comprising modifying the first content timeline on the client-side online content timeline datastore before transmitting the modified version to the server-side online content timeline editing engine.

20. The method of claim 18, further comprising receiving a list of available content from the server-side online content timeline editing engine, wherein an item from the list is utilized when modifying the first content timeline.

* * * * *